United States Patent [19]

Yoshioka

[11] Patent Number: 4,878,703
[45] Date of Patent: Nov. 7, 1989

[54] IMPLEMENT FOR DISPOSING OF DUNG OF A PET ANIMAL

[76] Inventor: Mashayuki Yoshioka, 3-31, 2-chome Higashiyurigaoka, Aso-ku, Kawasaki, Kanagawa, Japan

[21] Appl. No.: 237,963

[22] Filed: Aug. 29, 1988

[30] Foreign Application Priority Data

May 24, 1988 [JP] Japan .............................. 63-68343[U]

[51] Int. Cl.$^4$ .......................... A01K 29/00; E01H 1/12
[52] U.S. Cl. ...................................................... 294/1.5
[58] Field of Search .................................. 294/1.3–1.5, 294/19.1, 55, 115; 15/104.8, 257.1, 257.6, 257.7; 119/1; 135/66; 248/95, 99, 101

[56] References Cited

U.S. PATENT DOCUMENTS

| | | | |
|---|---|---|---|
| 3,777,708 | 12/1973 | Vogt | 294/1.5 |
| 3,819,220 | 6/1974 | Bredt | 294/1.5 |
| 4,003,595 | 1/1977 | Fano et al. | 294/1.5 |
| 4,037,867 | 7/1977 | Fano et al. | 294/1.4 |
| 4,056,278 | 11/1977 | Bau et al. | 294/1.4 |
| 4,136,900 | 1/1979 | Thompson | 294/1.5 |
| 4,335,678 | 6/1982 | Garza et al. | 294/1.5 |
| 4,466,647 | 8/1984 | Spevak | 294/1.5 |
| 4,717,186 | 1/1988 | Yoshioka | 294/1.5 |

Primary Examiner—Johnny D. Cherry
Attorney, Agent, or Firm—Helfgott & Karas

[57] ABSTRACT

An implement for disposing of dung of a pet animal adapted to be pointed to a rump of a pet animal by a user to receive dung from the pet animal through a vinyl sack thereof, comprises an elongated tubular body having first and second ends, a housing body mounted on the elongated tubular body and for carrying vertically stacked cartridges therein, a movable plate movably supported with respect to the housing body and for moving the cartridges within the housing body one by one in a longitudinal bore of the tubular body, a pushing member inserted in the longitudinal bore of the tubular body to be movably supported with respect to the tubular body and for pushing a cartridge having been located in the longitudinal bore of the tubular body by the movable plate toward the first end along the longitudinal bore of the tubular body, and an actuating mechanism mounted with respect to the tubular body and for automatically moving the pushing member toward the first end of the tubular body and automatically returning the pushing member toward the second end of the tubular body. The cartridge comprises a pair of casing members, and a vinyl sack having a resilient wire provided along a margin of an opening thereof and being supported in a manner to be folded up between the casing members through the resilient wire, so that the vinyl sack is spread due to an elastic force of the resilient wire when the cartridge is moved to the first end of the tubular body and then actively projected out of the first end of the tubular body by the pushing member.

33 Claims, 6 Drawing Sheets

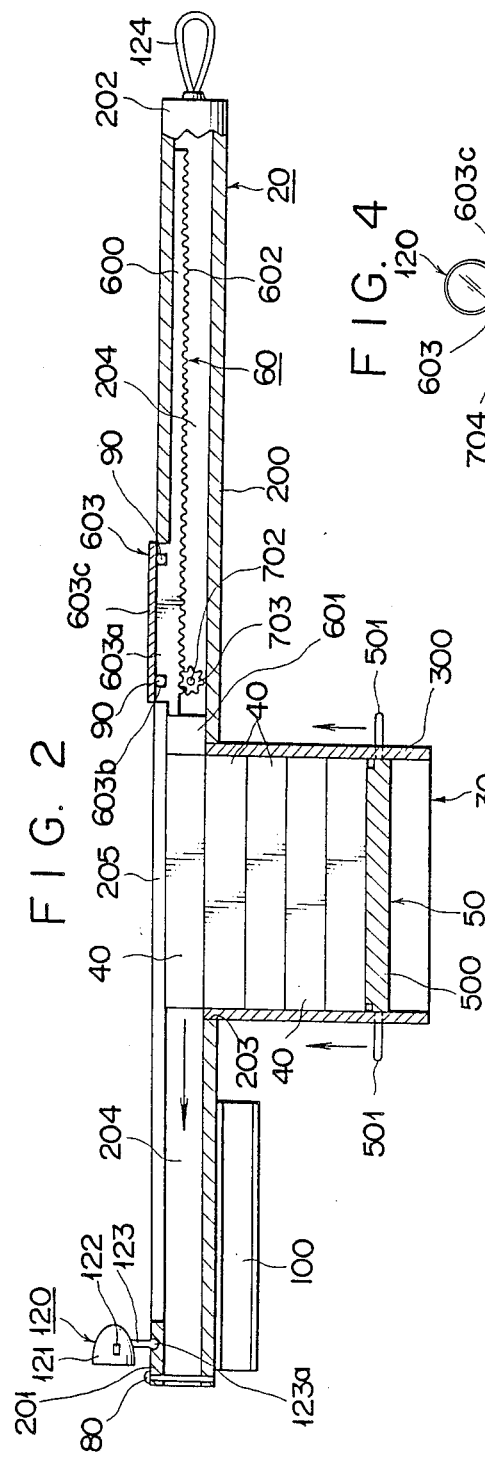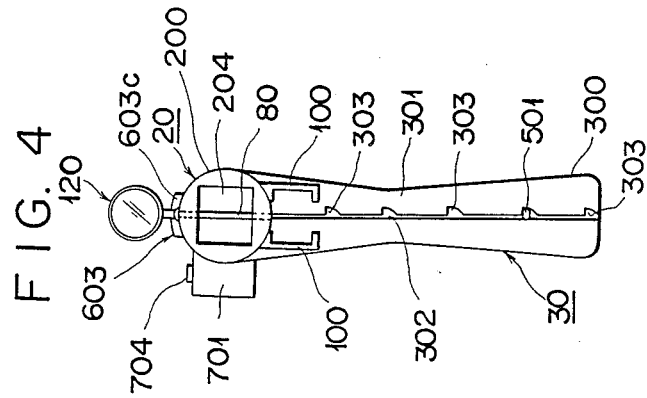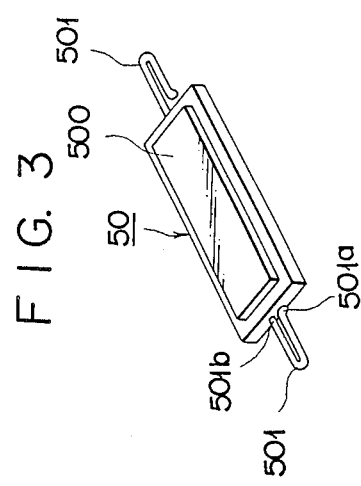

IMPLEMENT FOR DISPOSING OF DUNG OF A PET ANIMAL

BACKGROUND OF THE INVENTION

1. Field of the Invention

This invention relates to an improvement of an implement for disposing of dung of a pet animal such as a dog or the like, and more particularly to a dung disposing implement which is adapted to be pointed to a rump of a pet animal by a user, when the pet animal acts as if it had a call of nature, to receive dung excreted from it.

2. Description of the Prior Art

This kind of dung disposing implement is disclosed in U.S. Pat. No. 4,717,186 to Mashayuki Yoshioka, or the inventor of the present invention. The dung disposing implement of U.S. Pat. No. 4,717,186 comprises tubular means consisting of an elongated tubular body which has first and second ends and a pair of pins removably fitted through upper and lower walls of the first end to project in a longitudinal bore of the tubular body; storage means mounted on the tubular body of the tubular means and for carrying vertically stacked cartridges therein; a movable plate movably supported with respect to the storage means and for moving the cartridges within the storage means one by one in the longitudinal bore of the tubular body; and a pushing rod movably inserted at one end thereof from the second end of the tubular body in the longitudinal bore and for pushing a cartridge having been located in the longitudinal bore of the tubular body by the movable plate towards the first end of the tubular body along the longitudinal bore of the tubular body. Each of the cartridges includes a pair of casing members each having a substantially U-shape in vertical section and being pivotally connected at one end thereof to each other in a manner to be faced at an opened side thereof to each other; a vinyl sack having an opening for receiving dung of a pet animal therein and having a resilient wire provided along a margin of the opening of the vinyl sack, the vinyl sack being supported through the resilient wire between the faced sides of the casing members in a manner to be folded up; and two tape pieces applied across onto upper and lower surfaces of the casing members to cause the casing members to be closed toward each other against an elastic force of the resilient wire in a manner to permit a space to be left between the casing members, the space being enough to receive tip ends of the pins of the tubular body therein when the cartridge is moved to the first end of the tubular body by means of the pushing rod.

With the conventional dung disposing implement constructed as described above, forward and backward movements of the pushing rod relative to the tubular means are manually carried out. This highly complicates the work of disposing of dung of a pet animal.

SUMMARY OF THE INVENTION

It is therefore an object of the present invention to provide an implement for disposing of dung of a pet animal which is capable of automatically moving pushing means in a longitudinal bore of a tubular body along the longitudinal bore of the tubular body.

It is another object of this invention to provide an implement for disposing of dung of a pet animal as stated above, which is simple and can be formed easily.

Generally speaking, in accordance with the present invention, an implement for disposing of dung of a pet animal is provided which comprises tubular means consisting of an elongated tubular body which has first and second ends and a pin removably fitted to the first end in a manner to vertically penetrate the first end; storage means mounted on the tubular body of the tubular means and for carrying vertically stacked cartridges therein; movable means movably supported with respect to the storage means and for moving the cartridges within the storage means one by one in a longitudinal bore of the tubular body; pushing means inserted in the longitudinal bore of the tubular body to be movably supported with respect to the tubular body and for pushing a cartridge having been located in the longitudinal bore of the tubular body by the movable means toward the first end of the tubular body along the longitudinal bore of the tubular body; and actuating means mounted with respect to the tubular body of the tubular means and for automatically moving the pushing means toward the first end of the tubular body and automatically returning the pushing means toward the second end of the tubular body; each of the cartridges including a pair of casing members with each having a substantially U-shape in vertical section and being pivotally connected at one end thereof to each other in a manner to be faced at an opened side thereof to each other, a vinyl sack having an opening for receiving dung of a pet animal therein and having a resilient wire provided along a margin of the opening of the vinyl sack, the vinyl sack being supported through the resilient wire between the faced sides of the casing members in a manner to be folded up, and two tape pieces applied across onto upper and lower surfaces of the casing members to cause the casing members to be closed toward each other against an elastic force of the resilient wire in a manner to permit a space to be left between the casing members, the space being enough to receive the pin of the tubular body therein when the cartridge is moved to the first end of the tubular body by means of the pushing means.

In a preferred embodiment of the present invention, the tubular body has a linear slit formed in an upper wall portion thereof in a manner to extend along the longitudinal direction of the tubular body; the pushing means comprises a pushing rod which has a plurality of teeth formed along a longitudinal direction of its lower part, thereby constituting a rack, and a support member which has a substantially T-shape in vertical section and is provided on an upper portion of the pushing rod to project outwardly through the linear slit of the tubular body, so that the pushing means is movable along the longitudinal bore of the tubular body while being guided along the linear slit of the tubular body through the support member; and the actuating means includes a reversible motor arranged on a side wall portion near the second end of the tubular body in a manner such that a rotating shaft thereof penetrates the side wall portion of the tubular body in a direction perpendicular to the pushing rod to project in the longitudinal bore of the tubular body at its tip end, and a pinion attached to the tip end of the rotating shaft of the reversible motor to be engaged with the teeth of the pushing rod, so that when the rotating shaft of the reversible motor is rotated in one of clockwise and counterclockwise directions, the pinion is rotated in the same direction to move the pushing means toward the first end of the tubular body and when the rotating shaft of the reversible motor is rotated in the other of the clockwise and counterclockwise directions, the pinion is rotated in the same direction to move the pushing means toward the second end of the tubular body.

In a preferred embodiment of the present invention, the tubular body of the tubular means has a first linear slit formed in its upper wall portion in a manner to extend along the longitudinal direction of the tubular body and has a second linear slit formed in its side wall portion in a manner to extend along the longitudinal direction of the tubular body; the pushing means consists of a pushing block which is smaller than a diameter of the longitudinal bore of the tubular body and comprises a support member which has a substantially T-shape in vertical section and is provided on an upper portion of the block to project outwardly through the first linear slit of the tubular body, and a pin-like projection which is provided on a side portion of the block to project outwardly through the second linear slit of the tubular body; the actuating means comprises a reversible motor arranged on a side wall portion near the second end of the tubular body in a manner such that a rotating shaft thereof penetrates the tubular body in a direction perpendicular to the tubular body, a first pulley supported to a side wall portion near the first end of the tubular body through a rotatable shaft, a second pulley attached to a tip end of the rotating shaft of the reversible motor which projects outwardly from the tubular body, and a belt coupling the first and second pulleys; and the pin-like projection of the block which projects outwardly through the second linear slit of the tubular body is connected to the belt at its tip end, so that when the rotating shaft of the reversible motor is rotated in one of clockwise and counterclockwise directions to cause the second pulley to be rotated in the same direction, the belt travels to cause the pushing means to be moved along the longitudinal bore of the tubular body toward the first end of the tubular body and when the rotating shaft of the reversible motor is rotated in the other of the clockwise and counterclockwise directions to cause the second pulley to be rotated in the same direction, the belt travels to cause the pushing means to be moved along the longitudinal bore of the tubular body toward the second end of the tubular body.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference numerals designate the same parts throughout the Figures and wherein:

FIG. 2 is a sectional view of the dung disposing implement according to the first embodiment;

FIG. 3 is a schematic perspective view of movable means incorporated in the implement according to the first embodiment;

FIG. 4 is a side view of the implement according to the first embodiment;

DETAILED DESCRIPTION OF THE PREFERRED EMBODIMENTS

Figure 1:
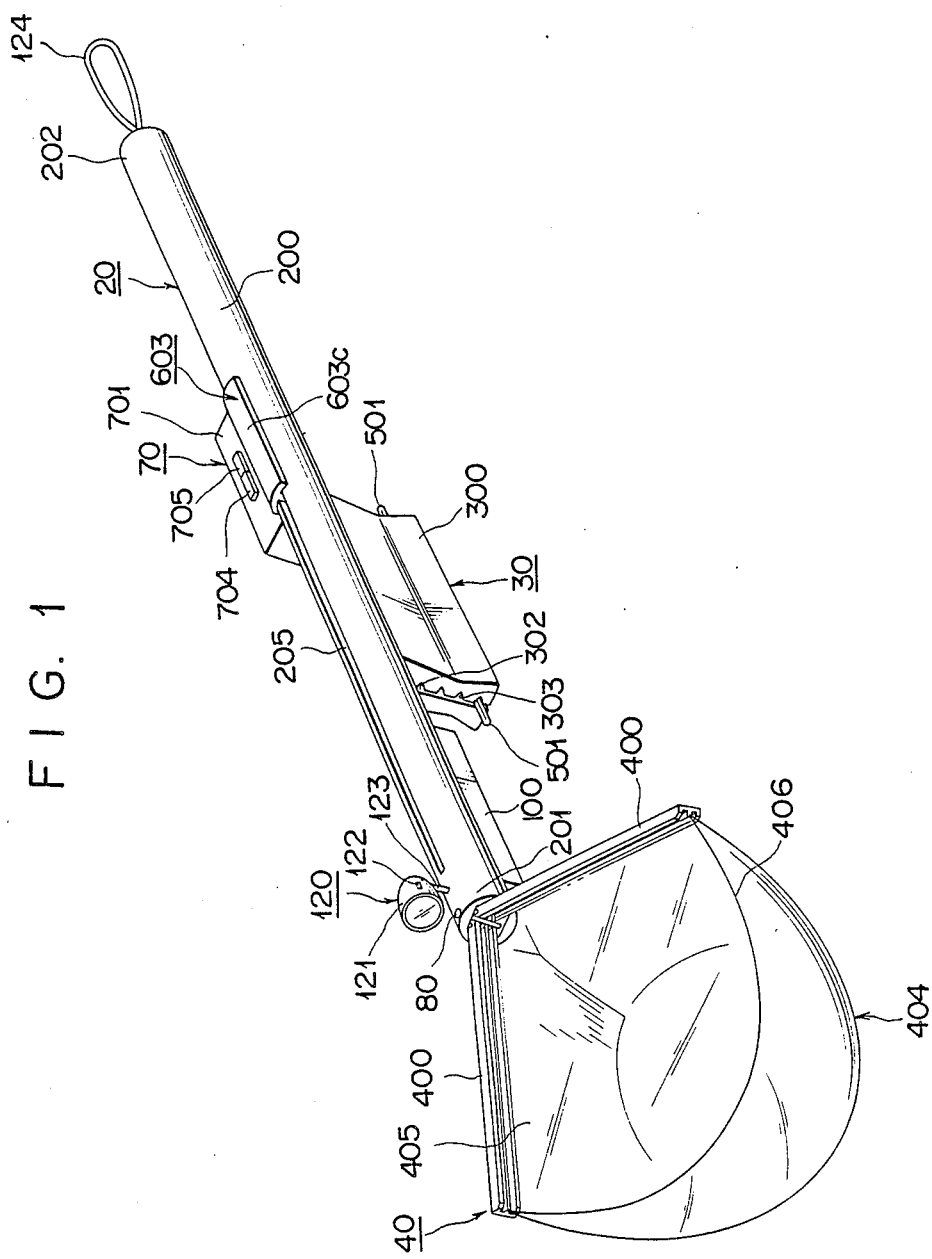
FIG. 1 is a schematic perspective view of an implement for disposing of dung of a pet animal according to a first embodiment of the present invention, in which a vinyl sack for receiving dung excreted from a pet animal is spread.

Referring to FIGS. 1 to 10, an implement for disposing of dung of a pet animal according to a first embodiment of this invention generally includes tubular means 20, storage means 30 for carrying vertically stacked cartridges 40 therein, each of which cartridges 40 has a vinyl sack contained therein and for receiving dung of a pet animal as described hereinafter, movable means 50, pushing means 60, and actuating means 70 for automatically moving the pushing means 60.

In the first embodiment being illustrated, the tubular means 20 consists of an elongated tubular body 200 which is made of light weight material such as plastic or the like and has a first end 201 and a second end 202. As shown in FIG. 2, the tubular body 200 further has an opening 203 formed in the approximately middle portion of the lower wall of its longitudinal direction and through-holes (not shown) formed in upper and lower wall portions of the first end 201. A reference numeral 80 designates a pin which is removably fitted in the through-holes in a manner to penetrate the tubular body. The pin 80 is preferably formed along its longitudinal direction with a cutting edge (not shown). The first embodiment employs the single pin 80 but can also employ a pair of pins which are fitted in the through-holes in a manner to project in a longitudinal bore 204 of the tubular body 200. In the case where a pair of pins are employed, the pins are each preferably pointed at its tip end.

The storage means 30 consists of a generally box-like housing body 300 which is made of light weight material such as plastic or the like and has an opening at its upper portion. The housing body 300 is adapted to carry vertically stacked cartridges 40 therein, as briefly stated above. By fitting an outer peripheral portion of the opened upper portion of the housing body 300 in the opening 203 of the tubular body 200, the storage means 30 is removably mounted with respect to the tubular means 20 so as to be perpendicular to the tubular means 20.

As described above, the implement of the first embodiment includes the movable means 50 movably supported with respect to the housing body 300, which movable means 50 serves to move upwardly the cartridges 40 within the housing body 300 one by one in the longitudinal bore 204 of the tubular body 200. Referring to FIG. 3, the movable means 50 comprises a plate-like body 500 which is formed by integrally laying a small plate on a top of a large plate, and U-shaped portions 501 which are integrally formed at both sides of the plate-like body 500 in a manner to extend outwardly from the both sides. Each U-shaped portion 501 is made of flexible material to be deformable and bulged at a free end 501a thereof. The movable means 50 formed as described above is supported at the U-shaped portions 501 thereof to both side walls 301 of the housing body 300 to be movable upwardly in the housing body 300. More particularly, the movable means 50 is movably supported to the housing body 300 in a manner such that the plate-like body 500 is arranged in the housing body 300, the U-shaped portions 501 of the movable means 50 are projected outwardly through vertically linear slits 302 which are formed at the both side walls 301 (only one side wall shown in FIG. 4) of the housing body 300, and the bulged free end 501a of each U-shaped portion 501 is fitted in the slit 302. The movable means 50 may be moved upwardly in the housing body 300 by sliding upwardly the U-shaped portions 501 along the slits 302 while deforming the bulged free ends 501a toward the other ends 501b of the U-shaped portions 501 by a user's fingers, whereby the cartridges 40 within the housing body 300 are moved upwardly. Thus, an uppermost one of the cartridges 40 vertically stacked in the housing body 300 is moved in the longitudinal bore 204 of the tubular body 200. In the first embodiment, along the respective slits 302 are formed a plurality of recesses 303 at equal intervals. When the U-shaped portions 501 of the movable means 50 are slid upwardly along the slits 302 of the housing body 300 while being deformed at the bulged free ends 501a toward the other ends 501b by user's fingers to reach positions at which the recesses 303 are formed and are then released from the user's fingers, the bulged free ends 501a are restituted to an original state due to a restoring force thereof to be engaged with the recesses 303, respectively. By such engagement of the bulged free ends 501a of the movable means 50 with the recesses 303 of the housing body 300, the movable means 50 is stationarily positioned with respect to the housing body 300.

As described above, the implement of the first embodiment further includes the pushing means 60 which serves to push a cartridge 40 having been positioned in the longitudinal bore 204 of the tubular body 200 by the movable means 50 toward the first end 201 of the tubular body 200 along the logitudinal bore 204 of the tubular body 200. The pushing means 60 comprises a pushing rod 600 which is movably inserted in the longitudinal bore 204 of the tubular body 200, and a pushing block 601 which is integrally provided at one end of the pushing rod 600 near the first end 201 of the tubular body 200 and formed slightly smaller than a diameter of the longitudinal bore 204 so as to be smoothly movable in the longitudinal bore 204 of the tubular body 200. The pushing rod 600 has a plurality of teeth 602 formed along a longitudinal direction of its lower part, thereby constituting a rack. Also, the pushing rod 600 comprises an elongated support member 603 which is integrally provided on an upper portion near the one end of the pushing rod 600 so as to extend along the longitudinal direction of the pushing rod 600 and has a substantially T-shape in vertical section. Through the support member 603, the pushing means 60 is movably supported with respect to the tubular body 200. More particularly, the T-shaped support member 603 projects upwardly through a linear slit 205 which is formed in an upper wall portion of the tubular body 200 in a manner to extend along the longitudinal direction of the tubular body 200. A vertical portion 603a of the T-shaped support member 603 has a width (measured in a direction perpendicular to a sheet of FIG. 2) smaller than that of the slit 205 of the tubular body 200 and is formed with recesses 603b in each of its both sides, in each of which recesses 603b a ball 90 is rollably received. Each of the balls 90 rollably received in the recesses 603b is engaged with the linear slit 205 of the tubular body 200, so that the pushing means 60 may be smoothly movable axially in the bore 204 of the tubular body 200 while being guided along the linear slit 205 through the balls 90. A horizontal portion 603c of the T-shaped support member 603 serves to prevent the balls 90 from being disengaged from the linear slit 205 during the longitudinal movement of the pushing means 60 in the bore 204 of the tubular body 200. For this purpose, the horizontal portion 603c of the T-shaped support member 603 is formed more than the width of the linear slit 205. This allows the pushing means 60 to be moved while being kept horizontal in the bore 204 of the tubular body 200.

Figure 5:
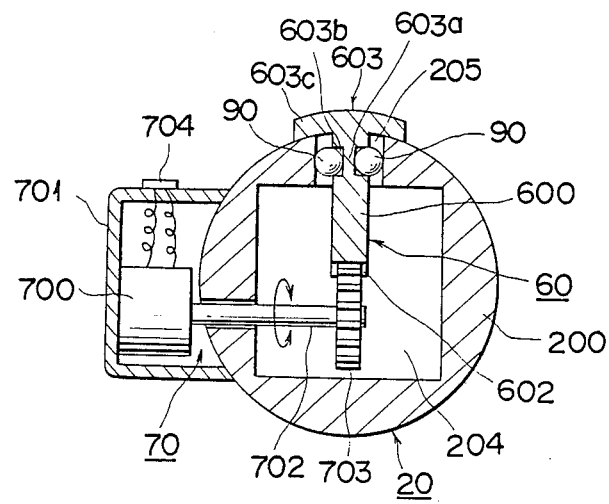
FIG. 5 is an enlarged vertical sectional view of the implement according to the first embodiment.
Figure 6:
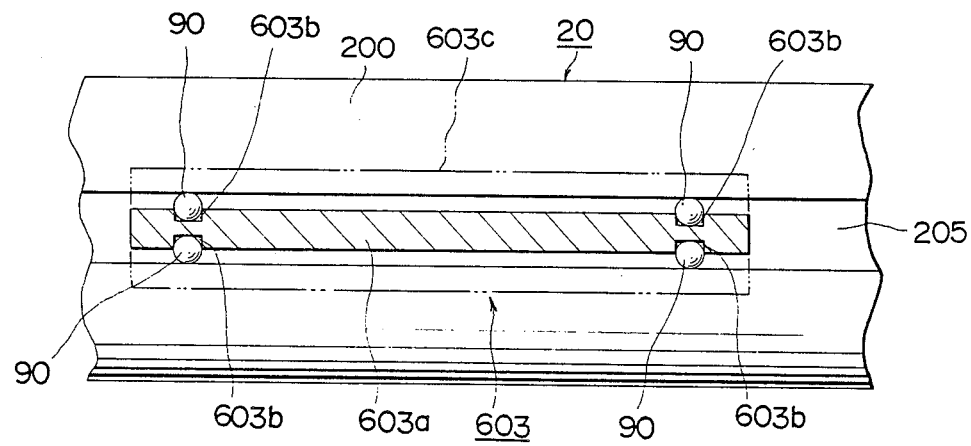
FIG. 6 is an enlarged segmentary plan view of the implement according to the first embodiment.
Figure 7:
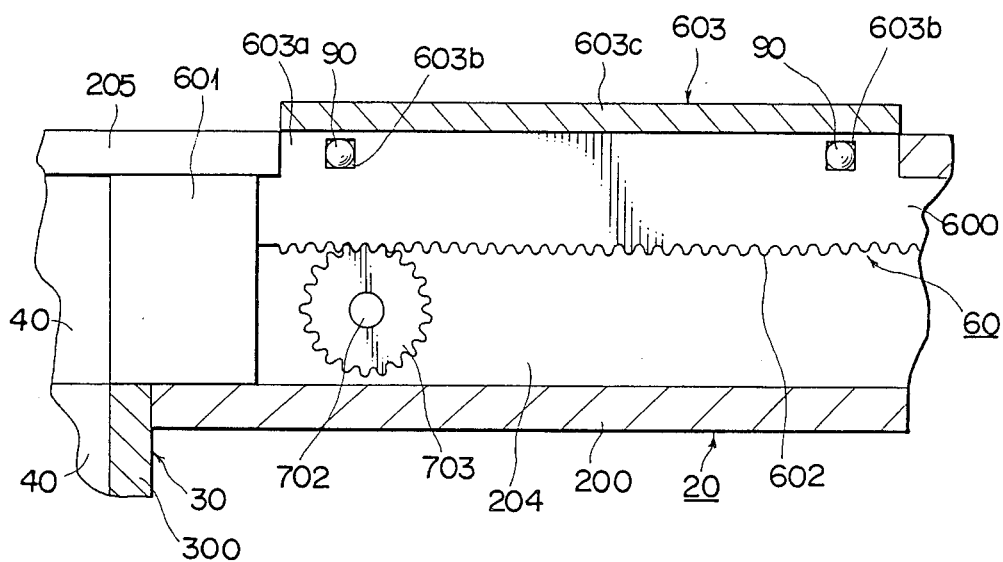
FIG. 7 is an enlarged segmentary sectional view of the implement according to the first embodiment.

As briefly described above, the implement of the first embodiment further includes the actuating means 70 for automatically moving the pushing means 60. Referring to FIG. 5, the actuating means 70 comprises a reversible motor 700 housed within a box 701 which is mounted on a side wall portion near the second end 202 of the tubular body 200, a rotating shaft 702 of reversible motor 700 which penetrates the side wall portion of the tubular body 200 to project in the longitudinal bore 204 of the tubular body 200 at its tip end in a manner to be perpendicular to the pushing rod 600. The actuating means 70 further comprises a pinion 703 which is attached to the tip end of the rotating shaft 702 to be mated with the teeth 602 of the pushing rod 600. Projecting upwardly from the box 701 as shown in FIG. 1 are switching buttons 704 and 705 for the reversible motor 700. One of the switching buttons 704 and 705, for example, the switching button 704 serves to cause the rotating shaft 702 of the reversible motor 700 to be rotated in a counterclockwise direction. The other of the switching buttons 704 and 705, namely, the switching button 705, serves to cause the rotating shaft 702 of the reversible motor 700 to be rotated in a clockwise direction. The reversible motor 700 is electrically connected to at least one dry battery (not shown) housed within the box 701. When the switching button 704 is pressed to cause the rotating shaft 702 of the reversible motor 700 to be rotated in the counterclockwise direction, the pinion 703 secured to the tip end of the rotating shaft 702 of the reversible motor 700 is rotated in the same direction, whereby the pushing means 60 engaged with the pinion 703 through its teeth 602 is moved toward the first end 201 of the tubular body 200. Also, when the switching button 705 is pressed to cause the rotating shaft 702 of the reversible motor 70 to be rotated in the clockwise direction, the pinion 703 is rotated in the same direction, whereby the pushing means 60 is moved toward the second end 202 of the tubular body 200.

A reference numeral 100 designates a pair of support plates each having a substantially U-shaped in vertical section. The support plates 100 are arranged on a lower wall surface near the first end 201 of the tubular body 200 so as to be extended along the longitudinal direction of the tubular body 200 and spaced at the opened sides thereof from each other. Attached to an upper wall portion near the first end 201 of the tubular body 200 is a lighting fixture 120. The lighting fixture 120 comprises a casing 121, at least one dry battery (not shown)

housed within the casing 121, an electric bulb (not shown) supported within the casing 121 and electrically connected to the unshown dry battery, and a switch 122. The lighting fixture 120 is pivotally supported to the upper wall portion near the first end 201 of the tubular body 200 through a support 123. More particularly, the lighting fixture 120 is mounted on the support 123 as shown in FIG. 2, a lower end of which support 123 is formed with a generally sphere-like portion 123a which is fitted in a generally sphere-like recess formed in the upper wall portion near the first end 201 of the tubular body 200, so that the lighting fixture 120 may pivot about the support 123. The unshown electric bulb, when the switch 122 is turned on, is adapted to light up. Thus, even when a person walks a pet animal at night, he can effectively carry out the work of disposing of dung of the pet animal while illuminating a rump of the pet animal by means of the lighting fixture 120. A reference numeral 124 designates a loop which is attached to the second end 202 of the tubular body 200 and serves to hang the disposing implement on, for example, a wall of a house therethrough when the disposing implement is in nonuse.

Figure 8:
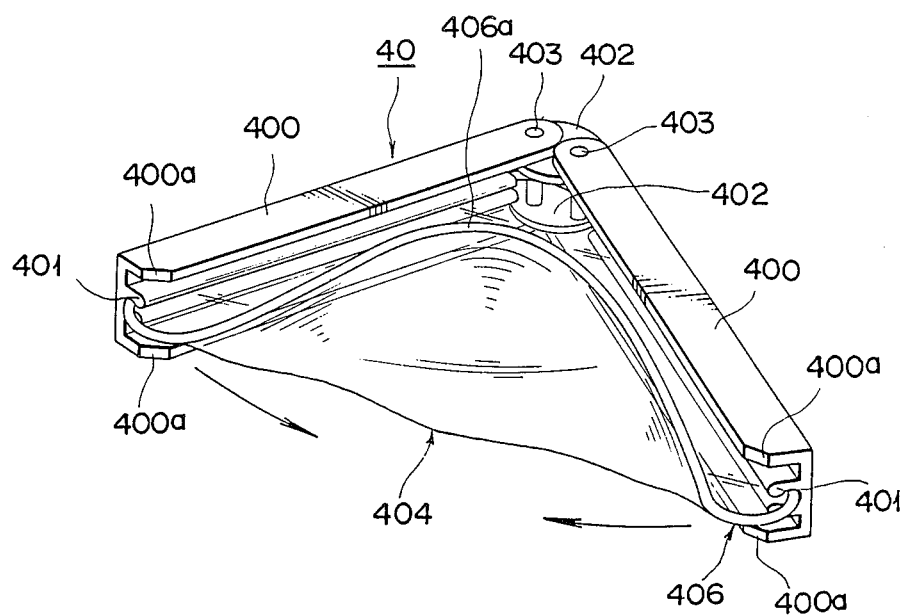
FIG. 8 is a schematic perspective view of a cartridge, in which a pair of casing members are opened.
Figure 9:
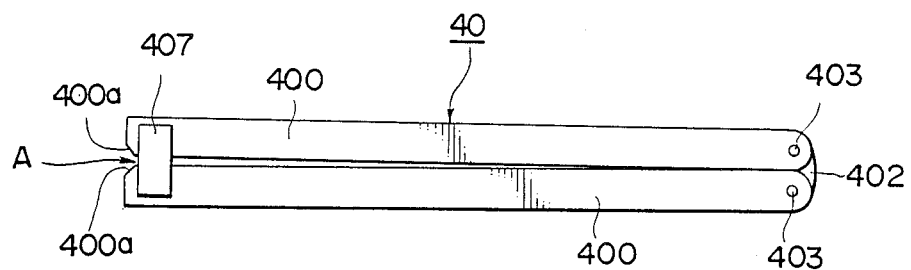
FIG. 9 is a plan view of the cartridge.
Figure 10:
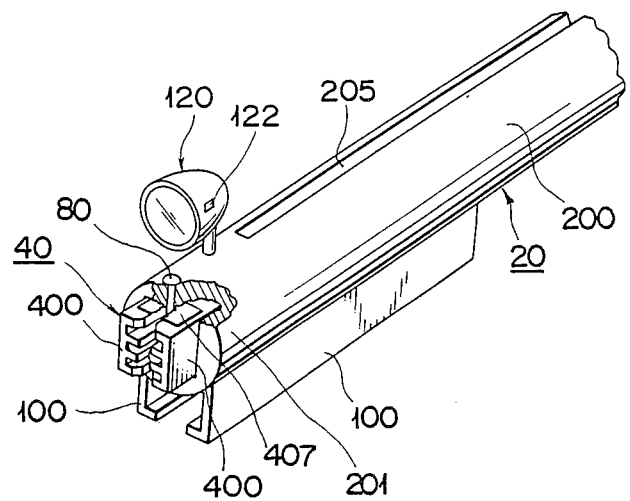
FIG. 10 is a schematic perspective view of assistance in explaining a state of a tape piece applied across onto upper surfaces of the casing members being torn by means of a pin.

The cartridge 40, as shown in FIG. 8, comprises a pair of casing members 400 each having a substantially U-like configuration in vertical section. Each casing member 400 is integrally formed along a longitudinal direction of an inner surface of an opened side thereof with a linear socket portion 401. The casing members 400 are pivotally connected at one end thereof to each other through a pair of substantially disk-like joining plates 402 by pins 403 so as to be faced to each other at the opened sides thereof. Also, arranged between the faced sides of the casing members 400 is a vinyl sack 404 having an opening 405 (FIG. 1) formed at a top portion thereof and for receiving dung of a pet animal. More particularly, the vinyl sack 404 is provided along a margin of the opening 405 thereof with a resilient wire 406 such as a piano wire or the like, which resilient wire 406 is partially fitted in the socket portion 401 of each of the casing members 400 in a manner to creep along the socket portion 401. A part of the resilient wire 406, namely, a portion 406a of the resilient wire 406 being not fitted in the socket portions 401 of the casing members 400 and extending outwardly from the casing members 400, is folded back so as to be arranged in a space between the casing members 400 as shown in FIG. 8. The vinyl sack 404 supported between the casing members 400 by fitting the resilient wire 406 in the socket portions 401 of the casing members 400 as described above is folded up and then contained in the casing members 400 by closing the casing members 400 toward each other. In order to prevent the casing members 400 from being opened away from each other due to an elastic force of the resilient wire 406 during the movement of the cartridge 40, adhesive tape pieces 407 are applied onto upper and lower surfaces of free ends of the casing members 400 (only upper surfaces of the casing members 400 are shown in FIG. 9) in a manner to be laid across the casing members 400. Further, the adhesive tape pieces 407 are applied onto the casing members 400 so as to permit a space A to be left between the casing members 400, as shown in FIG. 9. The space A is enough to receive the pin 80 of the tubular body 200 therein, when the cartridge 40 is moved to the first end 201 of the tubular body 200 by the pushing means 60. As described above, the application of the adhesive tape pieces 407 to the casing members 400 may prevent the casing members 400 from opening away from each other due to the elastic force of the resilient wire 406 during upward movement of the cartridge 40 through the movable means 50 and longitudinal movement of the cartridge 40 through the pushing means 60, so that the cartridge 40 may be smoothly moved. Also, the free ends of the casing members 400 are chamfered at their portions 400a which face each other, thereby facilitating insertion of the pin 80 into space A.

Incidentally, each cartridge 40 is received within the housing body 300 of the storage means 30 in a manner such that the free end sides of the casing members 400 are faced toward the first end 201 of the tubular body 200.

Now, the manner of operation of the dung disposing implement of the first embodiment constructed in the manner as described above will be described hereinafter with reference to FIGS. 1 to 10.

First, when the cartridges 40 are moved upwardly within the housing body 300 of the storage means 30 by sliding upwardly the U-shaped portions 501 of the movable means 50 along the slits 302 of the housing body 300 while deforming the bulged free ends 501a toward the other ends 501b of the U-shaped portions 501 by a user's fingers, an uppermost one of the cartridges 40 is moved in the longitudinal bore 204 of the tubular body 200. At this time, the bulged free ends 501a of the U-shaped portions 501 are each at the forming position of one of the recesses 303 on the slit 302 of the housing body 300. Accordingly, when the U-shaped portions 501 are released from the user's fingers, the bulged free ends 501a of the U-shaped portions 501 are operatively engaged with the recesses 303 due to the restoring force thereof. Thus, the movable means 50 is stationarily positioned with respect to the housing body 300, so that the uppermost cartridge in the longitudinal bore 204 is prevented from being moved downwardly.

In a state that the uppermost cartridge is in the longitudinal bore 204 of the tubular body 200 as shown in FIG. 2, when the switching button 704 is pressed by the user's finger to cause the rotating shaft 702 of the reversible motor 700 to be rotated in the counterclockwise direction, the pinion 703 is rotated in the same direction to cause the pushing means 60 to be moved toward the first end 201 of the tubular body 200, resulting in the uppermost cartridge being moved along the longitudinal bore 204 of the tubular body 200 toward the first end 201 of the tubular body 200. When the cartridge 40 reaches the first end 201 of the tubular body 200, the pin 80 penetrating the first end 201 of the tubular body 200 is received in the space A between the casing members 400 of the cartridge 40. Then, the cartridge 40 is actively projected partially out of the first end 201 of the tubular body 200 by the pushing block 601 due to the continuous actuation of the motor 700. In relation to such projecting motion of the cartridge 40, the pin 80 having been in the space A between the casing members 400 is operatively squeezed between the casing members 400 to cause the adhesive tape pieces 407 attached across onto the upper and lower surfaces of the casing members 400 to be torn across. Then, when the tape pieces 407 are completely torn by the pin 80, the casing members 400 are opened away from each other due to the elastic force of the resilient wire 406 of the vinyl sack 404 while being further actively projected out of the first end 201 of the tubular body 200 by the pushing block 601 due to the continuous actuation of the motor 700. When the resilient wire 406 of the vinyl sack 404 having been folded between the casing members 400 causes the casing members 400 to be opened away from each other while restoring to an original state, the vinyl sack 404 having been folded up between the casing members 400 is simultaneously spread, resulting in the opening 405 of the vinyl sack 404 being completely opened. The projecting motion of the cartridge 40 out of the first end 201 of the tubular body 200, when the cartridge 40 is actively projected outwardly to abut against the pin 80 at the pivotal connecting portion of the casing members 400 thereof, is stopped with the cartridge 40 being supported at the connecting portion of the casing members 400 thereof with respect to the first end 201 of the tubular body 200 through the pin 80. At this time, the switching button 704 is released from the user's finger, resulting in the motor 700 stopping.

In a state of the opening 405 of the vinyl sack 404 being completely opened due to the elastic force of the resilient wire 406 as shown in FIG. 1, the user points the implement body to a pet animal so as to cause the opened vinyl sack 404 to be held to a rump of the pet animal, whereby the vinyl sack 404 can receive dung excreted from the pet animal therein.

After receiving dung of the pet animal in the vinyl sack 404, the cartridge 40 may be removed from the tubular body 200 by plucking out the pin 80 from the tubular body 200 with the user's fingers. Then, the so-removed cartridge is inserted between the support plates 100 arranged on the lower wall surface of the tubular body 200 while causing the casing members 400 to be closed toward each other with the user's fingers, thus being supported between the support plates 100. In this state of the implement supporting the dung received cartridge between the support plates 100 thereof, the user carries it to a place where a garbage box is set, and then removes the cartridge from the support plates 100 to dump it into the garbage box.

Also, when the switching button 705 is pressed by the user's finger to cause the rotating shaft 702 of the reversible motor 700 to be rotated in the clockwise direction, the pinion 703 is rotated in the same direction to cause the pushing means 60 to be moved toward the second end 202 of the tubular body 200. Such movement of the pushing means 60, when the T-shaped support member 603 is abutted against one end of the linear slit 205 of the tubular body 200, is stopped. At this time, the switching button 705 is released from the user's finger, resulting in the reversible motor 700 stopping.

Figure 11:
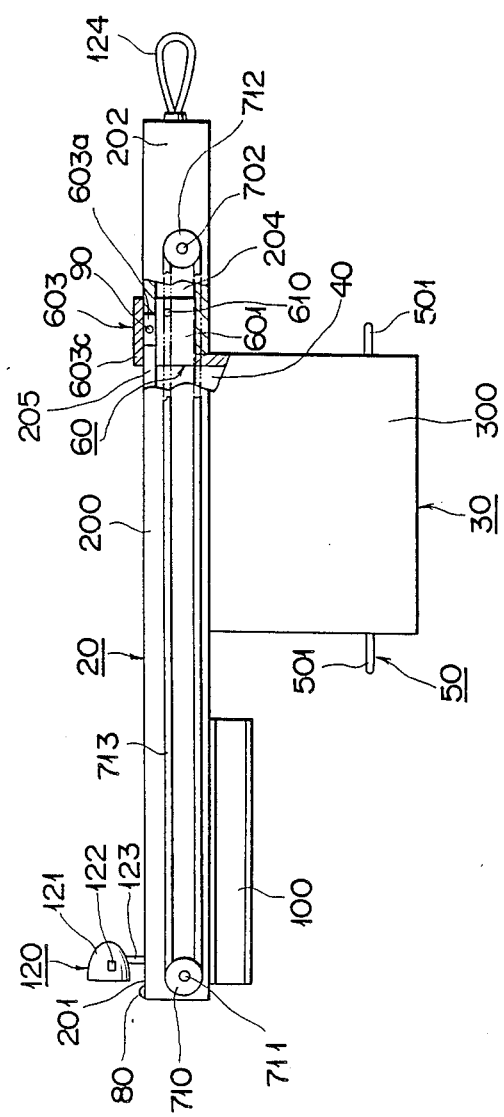
FIG. 11 is a front elevation view of an implement for disposing of dung of a pet animal according to a second embodiment of the present invention, with a part broken away to reveal a pushing block.

Referring now to FIG. 11, an implement for disposing of dung of a pet animal according to a second embodiment of this invention is substantially similar to that according to the first embodiment except that different pushing means and different actuating means are employed. In the second embodiment of FIG. 11, components which are similar to those shown in FIGS. 1 to 10 are designated with like reference numerals and the description of them will not be repeated.

Pushing means 60 consists of a pushing block 601 which is movably inserted in the longitudinal bore 204 of the tubular body 200 and formed slightly smaller than a diameter of the longitudinal bore 204 so as to be smoothly movable in the longitudinal bore 204 of the tubular body 200. The pushing block 601 is integrally formed on an upper surface thereof with a support member 603 which has a substantially T-shape in vertical section. The T-shaped support member 603 projects upwardly through a first linear slit 205 which is formed in an upper wall portion of the tubular body 200 in a manner to extend along the longitudinal direction of the tubular body 200. A vertical portion 603a of the T-shaped support member 603 has a width (measured in a direction perpendicular to sheet of FIG. 11) smaller than that of the first linear slit 205 of the tubular body 200 and is formed at each of its both sides with a recess (not shown), in each of which recesses a ball 90 is rollably received. The balls 90 rollably received in the unshown recesses are engaged with the first linear slit 205 of the tubular body 200, so that the pushing block 601 may be movable axially in the bore 204 of the tubular body 200 while being guided along the first linear slit 205 through the balls 90. A horizontal portion 603c of the T-shaped support member 603 serves to prevent the balls 90 from being disengaged from the first linear slit 205 during the longitudinal movement of the pushing block 601 in the bore 204 of the tubular body 200. For this purpose, the horizontal portion 603c of the T-shaped support member 603 is formed more than the width of the first linear slit 205. Further, the pushing block 601 has a pin-like projection 610 provided on its side portion in a manner to be perpendicular to the tubular body 200, which pin-like projection 610 projects outwardly from the tubular body 200 via a second linear slit (not shown) which is formed in a side wall portion of the tubular body 200 in a manner to extend along the longitudinal direction of the tubular body 200.

Actuating means comprises a reversible motor (not shown) housed within a box (not shown) which is mounted on a side wall portion near the second end 202 of the tubular body 200, a rotating shaft 702 of which unshown reversible motor penetrates the tubular body 200 in a direction perpendicular to the tubular body 200; a first pulley 710 supported to a side wall portion near the first end 201 of the tubular body 200 through a rotatable shaft 711; a second pulley 712 secured to a tip end of the rotating shaft 702 of the reversible motor which projects outwardly from the tubular body 200; and a belt 713 coupling the first pulley 710 and the second pulley 712. The pin-like projection 610 of the pushing block 601, which projects outwardly from the tubular body 200 through the unshown second linear slit of the tubular body 200, is connected at its tip end to the belt 713. The remaining components of the dung disposing implement according to the second embodiment of this invention are constructed and arranged in substantially the same manner as those shown in FIGS. 1 to 10.

The operation of the second embodiment will now be described with reference to FIG. 11. When the rotating shaft 702 of the reversible motor is rotated in a counter-clockwise direction, the second pulley 712 is rotated in the same direction to cause the belt 713 to travel toward the first end 201 of the tubular body 200. Simultaneously with the traveling of the belt 713, the pushing block 601 is moved toward the first end 201 of the tubular body 200 along the longitudinal bore 204 of the tubular body 200, whereby a cartridge 40 is also moved toward the first end 201 of the tubular body 200. After that, the cartridge 40 is projected out of the first end 201 of the tubular body 200 in the same manner as explained in the description of the first embodiment. Also, when the rotating shaft 702 of the reversible motor is rotated in a clockwise direction, the second pulley 712 is rotated in the same direction to cause the belt 713 to travel toward the second end 202 of the tubular body 200, whereby the pushing block 601 is also moved toward the second end 202 of the tubular body 200.

As described above, in the dung disposing implement according to this invention, the pushing means can be automatically moved along the longitudinal bore of the tubular body, so that the dung disposing implement can easily and efficiently carry out disposing of dung of a pet animal with simple operation.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to coverr all of the generic and specific features of the invention herein described, and all statements of the scope of the invention which, as a matter of language, might be said to fall therebetween.

What is claimed is:

1. An implement for disposing of dung of a pet animal comprising:

tubular means consisting of an elongated tubular body which has first and second ends and a pin removably fitted to said first end in a manner to vertically penetrate said first end;

storage means mounted on said tubular body of said tubular means and for carrying vertically stacked cartridges therein;

movable means movably supported with respect to said storage means and for moving said cartridges within said storage means one by one in a longitudinal bore of said tubular body;

pushing means inserted in said longitudinal bore of said tubular body to be movably supported with respect to said tubular body and for pushing a cartridge having been located in said longitudinal bore of said tubular body by said movable means toward said first end of said tubular body along said longitudinal bore of said tubular body; and actuating means mounted with respect to said tubular body of said tubular means and for automatically moving said pushing means toward said first end of said tubular body and automatically returning said pushing means toward said second end of said tubular body;

each of said cartridges including a pair of casing members each having a substantially U-shape in vertical section and being pivotally connected at one end thereof to each other in a manner to be faced at an opened side thereof to each other; a vinyl sack having an opening for receiving dung of a pet animal therein and having resilient wire provided along a margin of said opening of said vinyl sack, said vinyl sack being supported through said resilient wire between the faced sides of said casing members in a manner to be folded up; and two tape pieces applied across onto upper and lower surfaces of said casing members to cause said casing members to be closed toward each other against an elastic force of said resilient wire in a manner to permit a space to be left between said casing members, said space being enough to receive said pin of said tubular body therein when said cartridge is moved to said first end of said tubular body by means of said pushing means.

2. An implement for disposing of dung of a pet animal as defined in claim 1 and which includes support means arranged on a lower wall surface near said first end of said tubular body and for supporting a dung received cartridge therethrough.

3. An implement for disposing of dung of a pet animal as defined in claim 1 and which includes lighting means pivotally supported to an upper wall portion near said first end of said tubular body.

4. An implement for disposing of dung of a pet animal as defined in claim 1, wherein said storage means is removably mounted on said tubular body of said tubular means.

5. An implement for disposing of dung of a pet animal as defined in claim 1, wherein said storage means consists of a substantially box-like housing body adapted to carry vertically stacked cartridges therein, said housing body comprising a vertically linear slit formed at each side wall of said housing body and a plurality of recesses formed along said linear slit at equal intervals; and said movable means comprises a plate-like body and substantially U-shaped portions made of flexible material and extending outwardly from both sides of said plate-like body, said U-shaped portions each being bulged at a free end thereof, which movable means is movably supported with respect to said storage means in a manner such that said plate-like body thereof is arranged in said housing body, said U-shaped portions thereof are projected outwardly through said linear slits of said housing body and said bulged free ends thereof are fitted in said linear slits, respectively, so that said movable means can be moved in said housing body while being guided along said linear slits through said U-shaped portions and when said U-shaped portions each arrive at one of said recesses of said linear slit, said bulged free ends of said U-shaped portions are adapted to be engaged with said recesses due to a restoring force thereof.

6. An implement for disposing of dung of a pet animal as defined in claim 1, wherein said casing members of each said cartridge are pivotally connected at said one end thereof to each other through a pair of substantially disk-like joining plates by pins.

7. An implement for disposing of dung of a pet animal as defined in claim 1, wherein each of said casing members of each said cartridge has a linear socket portion integrally formed along a longitudinal direction of an inner surface of said opened side of said casing member and said vinyl sack is supported between said casing members in a manner such that said resilient wire of said vinyl sack is fitted in said linear socket portion of each of said casing members.

8. An implement for disposing of dung of a pet animal as defined in claim 1, wherein free ends of said casing members are chamfered at their portions which face each other.

9. An implement for disposing of dung of a pet animal as defined in claim 1, wherein said resilient wire is a piano wire.

10. An implement for disposing of dung of a pet animal as defined in claim 1 and which further includes support means arranged on a lower wall surface near said first end of said tubular body and for supporting a dung received cartridge therethrough, and lighting means pivotally supported to an upper wall portion near said first end of said tubular body, and wherein said storage means consists of a substantially box-like housing body which is adapted to carry vertically stacked cartridges therein and removably mounted on said tubular body of said tubular means, said housing body comprising a vertically linear slit formed at each side wall of said housing body and a plurality of recesses formed along said linear slit at equal intervals;

said movable means comprises a plate-like body and substantially U-shaped portions made of flexible material and extending outwardly from both sides of said plate-like body, said U-shaped portions each being bulged at a free end thereof, which movable means is movably supported with respect to said storage means in a manner such that said plate-like body thereof is arranged in said housing body, said U-shaped portions thereof are projected outwardly through said linear slits of said housing body and said bulged free ends thereof are fitted in said linear slits, respectively, so that said movable means can be moved in said housing body while being guided along said linear slits through said U-shaped portions and when said U-shaped portions each arrive at one of said recesses of said linear slit, said bulged free ends of said U-shaped portions are adapted to be engaged with said recesses due to a restoring force thereof;

each of said casing members of each said cartridge has a linear socket portion integrally formed along a longitudinal direction of an inner surface of said opened side of said casing member, free ends of which casing members are chamfered at their portions which face each other, said casing members being pivotally connected at said one end thereof to each other through a pair of substantially disk-like joining plates by pins; and said vinyl sack is supported between said casing members in a manner such that said resilient wire of said vinyl sack is fitted in said linear socket portion of each of said casing members.

11. An implement for disposing of dung of a pet animal as defined in claim 1, wherein said tubular body has a linear slit formed in an upper wall portion thereof in a manner to extend along the longitudinal direction of said tubular body;

said pushing means comprises a pushing rod which has a plurality of teeth formed along a longitudinal direction of its lower part, thereby constituting a rack, and a support member which has a substantially T-shape in vertical section and is provided on an upper portion of said pushing rod to project outwardly through said linear slit of said tubular body, so that said pushing means is movable along said longitudinal bore of said tubular body while being guided along said linear slit of said tubular body through said support member; and said actuating means includes a reversible motor arranged on a side wall portion near said second end of said tubular body in a manner such that a rotating shaft thereof penetrates the side wall portion of said tubular body in a direction perpendicular to said pushing rod to project in said longitudinal bore of said tubular body at its tip end, and a pinion attached to said tip end of said rotating shaft of said reversible motor to be engaged with said teeth of said pushing rod, so that when said rotating shaft of said reversible motor is rotated in one of clockwise and counterclockwise directions, said pinion is rotated in the same direction to move said pushing means toward said first end of said tubular body and when said rotating shaft of said reversible motor is rotated in the other of the clockwise and counterclockwise directions, said pinion is rotated in the same direction to move said pushing means toward said second end of said tubular body.

12. An implement for disposing of dung of a pet animal as defined in claim 11 and which includes support means arranged on a lower wall surface near said first end of said tubular body and for supporting a dung received cartridge therethrough.

13. An implement for disposing of dung of a pet animal as defined in claim 11 and which includes lighting means pivotally supported to an upper wall portion near said first end of said tubular body.

14. An implement for disposing of dung of a pet animal as defined in claim 11, wherein said storage means is removably mounted on said tubular body of said tubular means.

15. An implement for disposing of dung of a pet animal as defined in claim 11, wherein said storage means consists of a substantially box-like housing body adapted to carry vertically stacked cartridges therein, said housing body comprising a vertically linear slit formed at each side wall of said housing body and a plurality of recesses formed along said linear slit at equal intervals; and said movable means comprises a plate-like body and substantially U-shaped portions made of flexible material and extending outwardly from both sides of said plate-like body, said U-shaped portions each being bulged at a free end thereof, which movable means is movably supported with respect to said storage means in a manner such that said plate-like body thereof is arranged in said housing body, said U-shaped portions thereof are projected outwardly through said linear slits of said housing body and said bulged free ends thereof are fitted in said linear slits, respectively, so that said movable means can be moved in said housing body while being guided along said linear slits through said U-shaped portions and when U-shaped portions each arrive at one of said recesses of said linear slit, said bulged free ends of said U-shaped portions are adapted to be engaged with said recesses due to a restoring force thereof.

16. An implement for disposing of dung of a pet animal as defined in claim 11, wherein said casing members of each said cartridge are pivotally connected at said one end thereof to each other through a pair of substantially disk-like joining plates by pins.

17. An implement for disposing of dung of a pet animal as defined in claim 11, wherein each of said casing members of each said cartridge has a linear socket portion integrally formed along a longitudinal direction of an inner surface of said opened side of said casing member and said vinyl sack is supported between said casing members in a manner such that said resilient wire of said vinyl sack is fitted in said linear socket portion of each of said casing members.

18. An implement for disposing of dung of a pet animal as defined in claim 11, wherein free ends of said casing members are chamfered at their portions which face each other.

19. An implement for disposing of dung of a pet animal as defined in claim 11, wherein said resilient wire is a piano wire.

20. An implement for disposing of dung of a pet animal as defined in claim 11, wherein said pushing means further comprises a block provided at an end of said pushing rod near said first end of said tubular body, said block being smaller than a diameter of said longitudinal bore of said tubular body.

21. An implement for disposing of dung of a pet animal as defined in claim 11, wherein said T-shaped support member has at least one recess formed in each of both sides of its vertical portion, in which at least one recess a ball is rollably received, said ball being engaged with said linear slit of said tubular body.

22. An implement for disposing of dung of a pet animal as defined in claim 1 and which further includes support means arranged on a lower wall surface near said first end of said tubular body and for supporting a dung received cartridge therethrough, and lighting means pivotally supported to an upper wall portion near said first end of said tubular body, and wherein said tubular body has a linear slit formed in an upper wall portion thereof in a manner to extend along the longitudinal direction of said tubular body;

said storage means consists of a substantially box-like housing body which is adapted to carry vertically stacked cartridges therein and removably mounted on said tubular body of said tubular means, said housing body comprising a vertically linear slit formed at each side wall of said housing body and a plurality of recesses formed along said linear slit at equal intervals;

said movable means comprises a plate-like body and substantially U-shaped portions made of flexible material and extending outwardly from both sides of said plate-like body, said U-shaped portions each being bulged at a free end thereof, which movable means is movably supported with respect to said storage means in a manner such that said plate-like body thereof is arranged in said housing body, said U-shaped portions thereof are projected outwardly through said linear slits of said housing body and said bulged free ends thereof are fitted in said linear slits of said housing body, respectively, so that said movable means can be moved in said housing body while being guided along said linear slits of said housing body through said U-shaped portions and when said U-shaped portions each arrive at one of said recesses of said linear slit of said housing body, said bulged free ends of said U-shaped portions are adapted to be engaged with said recesses due to a restoring force thereof;

said pushing means comprises a pushing rod which has a plurality of teeth formed along a longitudinal direction of its lower part, thereby constituting a rack, a support member which has a substantially T-shaped in vertical section and is provided on an upper portion of said pushing rod to project outwardly through said linear slit of said tubular body, a vertical portion of which T-shaped support member has at least one recess formed in each of its both sides, in which at least one recess a ball is rollably received, said ball being engaged with said linear slit of said tubular body, and a block provided at an end of said pushing rod near said first end of said tubular body, said block being smaller than a diameter of said longitudinal bore of said tubular body;

said actuating means includes a reversible motor arranged on a side wall portion near second end of said tubular body in a manner such that a rotating shaft thereof penetrates the side wall portion of said tubular body in a direction perpendicular to said pushing rod to project in said longitudinal bore of said tubular body at its tip end, and a pinion attached to said tip end of said rotating shaft of said reversible motor to be engaged with said teeth of said pushing rod, so that when said rotating shaft of said reversible motor is rotated in one of clockwise and counterclockwise directions, said pinion is rotated in the same direction to move said pushing means toward said first end of said tubular body and when said rotating shaft of said reversible motor is rotated in the other of the clockwise and counterclockwise directions, said pinion is rotated in the same direction to move said pushing means toward said second end of said tubular body;

each of said casing members of each said cartridge has a linear socket portion integrally formed along a longitudinal direction of an inner surface of said opened side of said casing member, free ends of which casing members are chamfered at their portions which face each other, said casing members being pivotally connected at said one end thereof to each other through a pair of substantially disk-like joining plates by pins; and said vinyl sack is supported between said casing members in a manner such that said resilient wire of said vinyl sack is fitted in said linear socket portion of each of said casing members.

23. An implement for disposing of dung of a pet animal as defined in claim 1, wherein said tubular body of said tubular means has a first linear slit formed in its upper wall portion in a manner to extend along the longitudinal direction of said tubular body and has a second linear slit formed in its side wall portion in a manner to extend along the longitudinal direction of said tubular body;

said pushing means consists of a pushing block which is smaller than a diameter of said longitudinal bore of said tubular body and comprises a support member which has a substantially T-shape in vertical section and is provided on an upper portion of said block to project outwardly through said first linear slit of said tubular body, and a pin-like projection which is provided on a side portion of said block to project outwardly through said second linear slit of said tubular body;

said actuating means comprises a reversible motor arranged on a side wall portion near said second end of said tubular body in a manner such that a rotating shaft thereof penetrates said tubular body in a direction perpendicular to said tubular body, a first pulley supported to a side wall portion near said first end of said tubular body through a rotatable shaft, a second pulley attached to a tip end of said rotating shaft of said reversible motor which projects outwardly from said tubular body, and a belt coupling said first and second pulleys; and said pin-like projection of said block which projects outwardly through said linear second linear slit of said tubular body is connected to said belt at its tip end, so that when said rotating shaft of said reversible motor is rotated in one of clockwise and counterclockwise directions to cause said second pulley to be rotated in the same direction, said belt travels to cause said pushing means to be moved along the longitudinal bore of said tubular body toward said first end of said tubular body and when said rotating shaft of said reversible motor is rotated in the other of the clockwise and counterclockwise directions to cause said second pulley to be rotated in the same direction, said belt travels to cause said pushing means to be moved along the longitudinal bore of said tubular body toward said second end of said tubular body.

24. An implement for disposing of dung of a pet animal as defined in claim 23 and which includes support means arranged on a lower wall surface near said first end of said tubular body and for supporting a dung received cartridge therethrough.

25. An implement for disposing of dung of a pet animal as defined in claim 23 and which includes lighting means pivotally supported to an upper wall portion near said first end of said tubular body.

26. An implement for disposing of dung of a pet animal as defined in claim 23, wherein said storage means is removably mounted on said tubular body of said tubular means.

27. An implement for disposing of dung of a pet animal as defined in claim 23, wherein said storage means consists of a substantially box-like housing body adapted to carry vertically stacked cartridges therein, said housing body comprising a vertically linear slit formed at each side wall of said housing body and a plurality of recesses formed along said linear slit at equal intervals; and said movable means comprises a plate-like body and substantially U-shaped portions made of flexible material and extending outwardly from both sides of said plate-like body, said U-shaped portions each being bulged at a free end thereof, which movable means is movably supported with respect to said storage means in a manner such that said plate-like body thereof is arranged in said housing body, said U-shaped portions thereof are projected outwardly through said linear slits of said housing body and said bulged free ends thereof are fitted in said linear slits of said housing body, respectively, so that said movable means can be moved in said housing body while being guided along said linear slits of said housing body through said U-shaped portions and when said U-shaped portions each arrive at one of said recesses of said linear slit of said housing body, said bulged free ends of said U-shaped portions are adapted to be engaged with said recesses due to a restoring force thereof.

28. An implement for disposing of dung of a pet animal as defined in claim 23, wherein said casing members of each said cartridge are pivotally connected at said one end thereof to each other through a pair of substantially disk-like joining plates by pins.

29. An implement for disposing of dung of a pet animal as defined in claim 23, wherein each of said casing members has a linear socket portion integrally formed along a longitudinal direction of an inner surface of said opened side of said casing member and said vinyl sack is supported between said casing members in a manner such that said resilient wire of said vinyl sack is fitted in said linear socket portion of each of said casing members.

30. An implement for disposing of dung of a pet animal as defined in claim 23, wherein free ends of said casing members are chamfered at their portions which face each other.

31. An implement for disposing of dung of a pet animal as defined in claim 23, wherein said resilient wire is a piano wire.

32. An implement for disposing of dung of a pet animal as defined in claim 23, wherein said T-shaped support member of said pushing means has at least one recess formed at each of both sides of its vertical portion and a ball which is rollably received in said at least one recess of said support member to be engaged with said first linear slit of said tubular body.

33. An implement for disposing of dung of a pet animal as defined in claim 1 and which further includes support means arranged on a lower wall surface near said first end of said tubular body and for supporting a dung received cartridge therethrough, and lighting means pivotally supported to an upper wall portion near said first end of said tubular body; and wherein said tubular body has a first linear slit formed in its upper wall portion in a manner to extend along the longitudinal direction of said tubular body and a second linear slit formed in its side wall portion in a manner to extend along the longitudinal direction of said tubular body;

said storage means consists of a substantially box-like housing body which is adapted to carry vertically stacked cartridges therein and removably mounted on said tubular body of said tubular means, said housing body comprising a vertically linear slit formed at each side wall of said housing body and a plurality of recesses formed along said linear slit at equal intervals;

said movable means comprises a plate-like body and substantially U-shaped portions made of flexible material and extending outwardly from both sides of said plate-like body, said U-shaped portions each being bulged at a free end thereof, which movable means is movably supported with respect to said storage means in a manner such that said plate-like body thereof is arranged in said housing body, said U-shaped portions thereof are projected outwardly through said linear slits of said housing body and said bulged free ends thereof are fitted in said linear slits of said housing body, respectively, so that said movable means can be moved in said housing body while being guided along said linear slits of said housing body through said U-shaped portions and when said U-shaped portions each arrive at one of said recesses of said linear slit of said housing body, said bulged free ends of said U-shaped portions are adapted to be engaged with said recesses due to a restoring force thereof;

said pushing means consists of a pushing block which is smaller than a diameter of said longitudinal bore of said tubular body and comprises a support member which has a substantially T-shape in vertical section and is provided on an upper portion of said block to project outwardly through said first linear slit of said tubular body, a vertical portion of which T-shaped support member has at least one recess formed in each of its both sides, in which at least one recess a ball is rollably received, said ball being engaged with said first linear slit of said tubular body, and a pin-like projection which is provided on a side portion of said block to project outwardly through said second linear slit of said tubular body;

said actuating means comprises a reversible motor arranged on a side wall portion near said second end of said tubular body in a manner such that a rotating shaft thereof penetrates said tubular body in a direction perpendicular to said tubular body, a first pulley supported to a side wall portion near said first end of said tubular body through a rotatable shaft, a second pulley attached to a tip end of said rotating shaft of said reversible motor which projects outwardly from said tubular body, and a belt coupling said first and second pulleys;

said pin-like projection of said block which projects outwardly through said second linear slit of said tubular body is connected to said belt at its tip end, so that when said rotating shaft of said reversible motor is rotated in one of clockwise and counterclockwise directions to cause said second pulley to be rotated in the same direction, said belt travels to cause said pushing means to be moved along the longitudinal bore of said tubular body toward said first end of said tubular body and when said rotating shaft of said reversible motor is rotated in the other of the clockwise and counterclockwise directions to cause said second pulley to be rotated in the same direction, said belt travels to cause said pushing means to be moved along the longitudinal bore of said tubular body toward said second end of said tubular body;

each of said casing members of each said cartridge has a linear socket portion integrally formed along a longitudinal direction of an inner surface of said opened side of said casing member, free ends of which casing members are chamfered at their portions which face each other, said casing members being pivotally connected at said one end thereof to each other through a pair of substantially disk-like joining plates by pins; and said vinyl sack is supported between said casing members in a manner such that said resilient wire of said vinyl sack is fitted in said linear socket portion of each of said casing members.

* * * * *